US010066648B2

(12) United States Patent
Friedrich

(10) Patent No.: US 10,066,648 B2
(45) Date of Patent: Sep. 4, 2018

(54) HYDRAULIC SWIVEL DRIVE AND GRAB WITH SUCH SWIVEL DRIVE

(71) Applicant: Kinshofer GmbH, Waakirchen (DE)

(72) Inventor: Thomas Friedrich, Schliersee (DE)

(73) Assignee: Kinshofer GmbH, Waakirchen (DE)

( * ) Notice: Subject to any disclaimer, the term of this patent is extended or adjusted under 35 U.S.C. 154(b) by 211 days.

(21) Appl. No.: 15/283,049

(22) Filed: Sep. 30, 2016

(65) Prior Publication Data

US 2017/0097020 A1 Apr. 6, 2017

(30) Foreign Application Priority Data

Oct. 6, 2015 (DE) .................... 20 2015 006 973 U

(51) Int. Cl.
| | |
|---|---|
| *F15B 15/06* | (2006.01) |
| *B66C 3/16* | (2006.01) |
| *F16H 25/20* | (2006.01) |

(52) U.S. Cl.
CPC .............. *F15B 15/068* (2013.01); *B66C 3/16* (2013.01); *F16H 25/20* (2013.01); *F16H 2025/2028* (2013.01); *F16H 2025/2059* (2013.01)

(58) Field of Classification Search
CPC ................ F15B 15/068; F15B 15/1419; F15B 15/1409; F16H 25/20; F16H 2025/2028; F16H 2025/2059; B66C 3/16
USPC ............................................................ 92/33
See application file for complete search history.

(56) References Cited

U.S. PATENT DOCUMENTS

| | | | | |
|---|---|---|---|---|
| 3,187,592 A | * | 6/1965 | Geyer | ....................... F01B 9/04 |
| | | | | 74/89 |
| 4,745,847 A | * | 5/1988 | Voss | ........................ F01B 11/00 |
| | | | | 277/346 |
| 6,896,306 B2 | * | 5/2005 | Schierholz | ................ B66C 3/16 |
| | | | | 294/68.23 |

(Continued)

FOREIGN PATENT DOCUMENTS

| | | |
|---|---|---|
| DE | 2115707 A1 | 2/1972 |
| DE | 102005033452 A1 | 1/2007 |
| DE | 202006013101 U1 | 2/2008 |

OTHER PUBLICATIONS

German Search Report for Priority German Utility Model Application No. 20 2015 006 973.8 dated May 27, 2016.

*Primary Examiner* — Thomas E Lazo
(74) *Attorney, Agent, or Firm* — Troutman Sanders LLP; Ryan Schneider

(57) ABSTRACT

A hydraulic swivel drive for a grab that has two gripping arms or shells movable like tongs, including two swivel shafts parallel to each other and rotatably mounted in a drive housing, whose shaft ends are connectable with the gripper arms or shells, wherein the swivel shafts each have two oppositely threaded screw engagement portions, with which two pistons movable in opposite directions by means of hydraulic pressure for driving the swivel shafts are in screw engagement. Two differently large and differently contoured cylinder pressure chambers can be assigned to each piston in order to optimally adapt the cross-sectional area of the pistons for each of the reciprocating positioning movements and to appropriately select the pressure conditions. To be able to run in the differently contoured and dimensioned cylinder pressure chambers, each of the pistons is provided with different piston portions which are adapted to the respective cylinder pressure chamber.

20 Claims, 4 Drawing Sheets

(56) References Cited

U.S. PATENT DOCUMENTS 7,210,720 B2 * 5/2007 Kehler .................... E02F 3/404
　　　　　　　　　　　　　　　　　　　294/106

* cited by examiner

Section C-C

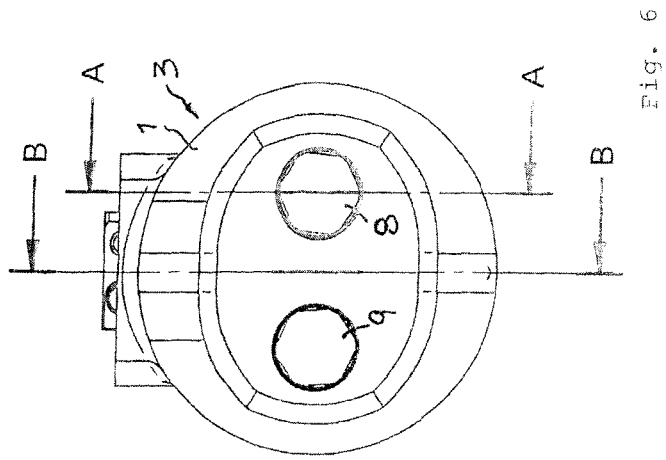
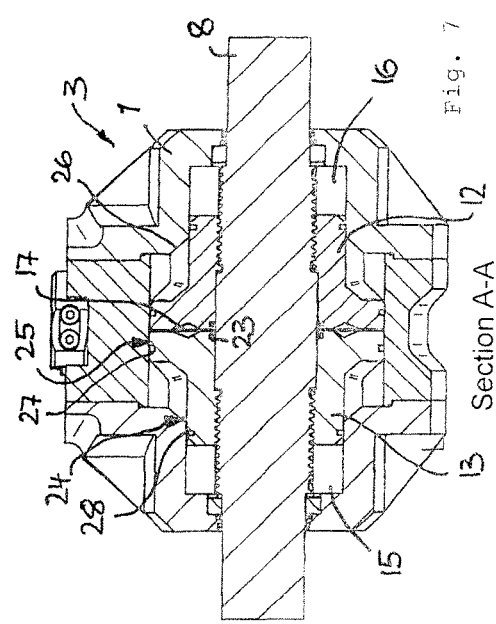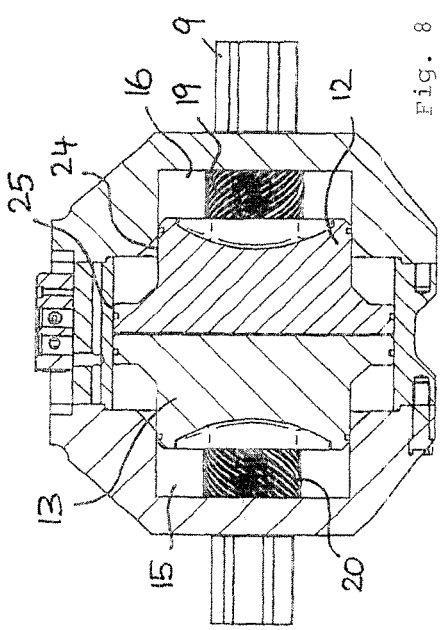

HYDRAULIC SWIVEL DRIVE AND GRAB WITH SUCH SWIVEL DRIVE

CROSS-REFERENCE TO RELATED APPLICATIONS

This application claims the benefit of German Utility Model Application No. 20 2015 006 973.8 filed 6 Oct. 2015, the entire contents and substance of which is hereby incorporated by reference.

BACKGROUND OF THE INVENTION

1. Field of Invention

The present invention relates to a hydraulic swivel drive for a grab which has two gripping arms or shells movable like tongs, comprising two swivel shafts parallel to each other and rotatably mounted in a drive housing, whose shaft ends are connectable with the gripper arms or shells, wherein the swivel shafts each have two oppositely threaded screw engagement portions, with which two pistons movable in opposite directions by means of hydraulic pressure for driving the swivel shafts are in screw engagement.

2. Background and Related Art

A swivel drive for a clamshell grab according to the prior art is known for example from DE 201 07 206 U1, in which the swivel shafts each are part of a hydraulic motor which is enclosed by the shell carrier formed as closed housing. On the two swivel shafts, which swivel the gripper arms or gripper shells open and closed, pipe sections each are seated, which are longitudinally shiftably, but non-rotatably guided and are in screw engagement with the respective swivel shaft, so that a longitudinal displacement of the pipe sections leads to a rotation of the swivel shafts. The longitudinal displacement of the pipe sections is effected by means of a common center piece which connects the pipe sections and is formed as piston which is accommodated in the interior of the housing that forms the cylinder for the piston and can be charged with hydraulic pressure through corresponding pressure chambers.

As in this known swivel drive the piston/cylinder volume is increasing continuously with increasing distance of the swivel shafts and hardly manageable forces thereby act on the housing, DE 203 19 227 U1 proposes to not form the entire shaft drive piece as piston, but to provide plunger pistons in the shaft drive piece, which are movable relative to the shaft drive piece by hydraulic pressure in corresponding plunger piston chambers and thereby can shift the shaft drive piece to and fro in the desired way.

In hydraulic swivel drives of this type high axial forces occur at the bearings of the swivel shafts, which result from the fact that the linear movement of the shaft drive piece is converted into the desired swivel shaft rotation by a screw engagement. To be able to produce the necessary high swivel shaft moments, the shaft drive piece must be driven axially with correspondingly high forces, which leads to correspondingly high axial reaction forces in the bearings of the swivel shafts. To absorb these forces, the swivel shafts usually are supported by means of axial plain bearings. This provides for the typical compact construction of the swivel drive and the shell carrier, whose outside dimensions cannot by extended arbitrarily by the gripper shells to be connected. Such axial plain bearing of the swivel shafts, however, was found to be disadvantageous for the efficiency of the drive.

To reduce the bearing resistance of the swivel shaft bearing, DE 20 2004 013 158 U1 proposes hydrostatic axial bearings for the swivel shafts, which are fed by the hydraulic pressure by means of which the shaft drive piece is shifted. However, this solution in turn requires a corresponding constructional effort, and in addition special constructive measures must be taken, in order to supply the pressure pockets of the hydrostatic bearings with pressure to a sufficient extent.

For the solution of the above-mentioned bearing problems and to manage the axial forces, DE 20 2006 013 101 U1 proposes the use of two pistons moving in opposite directions, which each are in screw engagement with both swivel shafts and thereby utilize oppositely threaded screw engagement portions of the swivel shaft, so that the swivel shafts are rotated into the one or other direction by the pistons moving apart from each other and inversely by the pistons moving towards each other. By such pistons movable in opposite directions the axial bearing pressure can be minimized, as the driving forces and reaction forces of the pistons largely compensate each other. However, in the known swivel drive according to DE 20 2006 013 101 U1 relatively high transversal forces act on the housing in a direction transversely to the longitudinal shaft axes, which require a correspondingly massive and therefore heavy formation of the housing. Due to the large-surface pistons, the housing shell which defines the cylinder pressure chambers also has a correspondingly large surface area, which under the influence of hydraulic pressure leads to large forces on the housing. In addition to the transversal forces high axial forces also act on the lateral housing covers through which the swivel shafts extend. Regardless of the compensation of the bearing forces on the shaft bearings, the bearing caps still are strongly loaded by the hydraulic pressure even with pistons moving in opposite directions, so that these bearing caps and their attachment to the housing base body also must be formed correspondingly massive.

Therefore, it is the object underlying the present invention to create an improved swivel drive of the type mentioned above, which avoids the disadvantages of the prior art and develops the latter in an advantageous way. Preferably, a lighter construction of the drive housing should be achieved, without therefore having to make concessions as regards the driving torque of the swivel shafts and the gripping force of the grab.

BRIEF SUMMARY OF THE INVENTION

Briefly described, in a preferred form, the present invention comprises a hydraulic swivel drive for a grab which has two gripping arms or shells movable like tongs, comprising two swivel shafts rotatably mounted in a drive housing and parallel to each other, whose shaft ends are connectable with the gripping arms, wherein the swivel shafts each have two oppositely threaded screw engagement portions, with which two pistons movable in opposite directions for driving the swivel shafts are in screw engagement, characterized in that the pistons each have two piston running surfaces on the outer shell surface, which are shaped differently in cross-section and are arranged to run in differently large cylinder pressure chambers shaped differently in cross-section, which are formed by the drive housing.

The present invention further comprises a grab, in particular clamshell grab, with a hydraulic swivel drive which is formed according to the above outlined hydraulic swivel drive.

It hence is proposed to assign two differently large and differently contoured cylinder pressure chambers to each piston, in order to optimally adapt the cross-sectional area of the pistons for each of the reciprocating positioning movements and to appropriately select the pressure conditions. To be able to run in the differently contoured and dimensioned cylinder pressure chambers, each of the pistons is provided with different piston portions which are adapted to the respective cylinder pressure chamber. According to the invention the pistons each have two piston running surfaces on the outer shell surface, which are shaped differently in cross-section and are arranged to run in cylinder pressure chambers formed by the drive housing, which are differently large and are shaped differently in cross-section. Due to the stepped, sectionally varying contouring of the pistons, differently high positioning forces and also different positioning speeds can be achieved in opposite positioning directions, without therefore requiring different pressure levels and different flow rates of the hydraulic pressurization, which of course can be provided nevertheless. In particular, one piston portion and the associated cylinder pressure chamber can optimally be adapted to the opening movement and the other piston portion and the associated cylinder pressure chamber can be adapted to the closing and gripping movement. Despite the specification to arrange each piston on both swivel shafts and the involved spatial constraints, the pressurization resulting for the housing can be limited and controlled by the sectionally different contouring of the pistons, without therefore having to make functionally relevant concessions as regards the driving torque of the swivel shafts and the gripping force of the grab.

In an advantageous development of the invention the pistons can be arranged to face each other with their respectively larger piston running surfaces, so that the cross-sectional area of the outer pressure chambers, which are arranged towards the lateral end walls, in particular housing covers, of the drive housing, is smaller than the cross-sectional area of the at least one inner pressure chamber located between the pistons. The compressive forces on the end walls thereby become smaller due to the smaller surface area. In the larger pressure chamber located between the pistons such axial forces do not play a relevant role. In the case of a common pressure chamber between the pistons there is no dividing wall which would be acted upon axially by the hydraulic pressure. Even if two separate pressure chambers are provided between the pistons and separated from each other by a dividing wall, the axial pressures on the dividing wall compensate each other, as the dividing wall then is exposed to corresponding pressures from opposite sides.

Advantageously, the orientation of the screw engagement portions at the pistons and swivel shafts can cooperate with the different pressure chambers such that the smaller pressure chambers, i.e. smaller in terms of the effective cross-sectional area, effect swiveling open of the gripper arms or shells coupled to the swivel shafts, while inversely the swiveling together of the gripper arms is effected by the larger cylinder pressure chamber cross-section. At actually the same pressure level, higher gripping forces thereby can be achieved, while inversely smaller driving torques are sufficient for swiveling open. In addition, a natural adaptation so to speak of the positioning speeds to the grab functions can be achieved without special control means for the flow rates: While on the one hand a finer, more easily controllable positioning movement takes effect on gripping, the grab is swiveled open more quickly with the same flow rate of the hydraulic fluid, as the pressure chambers with smaller cross-section are filled more quickly.

The different contouring of the various piston portions can be adapted to the different sizes of the cross-sectional areas, in particular such that in the cylinder pressure chamber of larger cross-sectional area the piston and cylinder pressure chamber cross-section is flattened less than in the pressure chambers of smaller surface area. This is based on the consideration that in the pressure chambers of larger cross-sectional area the circumference of the piston running surface and hence the circumference of the shell surface of the cylinder pressure chamber is longer than in the pressure chambers of smaller cross-sectional area, so that the housing wall in the region of the cylinder pressure chamber of larger cross-sectional area has a larger surface area and therefore is subjected to larger radial compressive forces than in the region of the cylinder pressure chamber of smaller cross-sectional area. Correspondingly, the higher radial compressive forces on the housing in the region of the cylinder pressure chamber of larger cross-sectional area can be absorbed better by the housing wall than this would be the case in a cross-section flattened more strongly, as flattened cross-sections under high internal pressures tend to be pressed open, i.e. the short main axis is elongated, while the long main axis is shortened.

In so far, the material of the housing wall can optimally be utilized due to the different cross-sectional contouring in conjunction with the different cross-sectional areas, and the radial pressurization can optimally be absorbed with a thin-walled, light construction, although the deviation from the flattened piston contour as such, which actually is specified by the existence of the two swivel shafts spaced from each other, does not seem to make sense, as sacrifices would have to be made in terms of a small overall size and hence a higher weight. However, since the radial compressive forces have little spreading effect, when the housing cross-section is flattened less, a weight advantage can be achieved due to a thinner wall thickness.

Advantageously, the piston portion flattened less can have an at least approximately circular cross-sectional contouring. The associated cylinder pressure chamber, which preferably is the cylinder pressure chamber of larger cross-sectional area, then correspondingly has the shape of a circular cylinder.

The piston portion flattened more strongly can be formed oval or elliptical or similarly rounded, wherein the cylinder pressure chamber in which this oval or elliptical or otherwise rounded piston portion extends has a correspondingly oval or elliptical or otherwise rounded cylinder cross-sectional contour.

The circular-cylindrical formation of the larger cylinder pressure chamber can optimally absorb the correspondingly higher radial forces on the cylinder wall, whereby small wall thicknesses are employed here and a corresponding weight saving can be achieved, when this is seen in comparison to a correspondingly flattened cylinder chamber.

Depending on how much the cross-sectional area of the flattened cylinder chamber deviates from the cross-sectional area of the cylinder chamber flattened less, in particular how much it is reduced, the wall thicknesses of the shell-surface-side cylinder pressure chamber walls can be chosen differently, as then the decrease of the radial forces occurring due to the reduction of the cross-sectional area becomes noticeable more or less. In a development of the invention the drive housing in a portion between the pistons, which defines the pressure chamber of larger cross-sectional area, can have a smaller wall thickness than in a housing portion which defines the outer, lateral pressure chambers on the side of the shell surface. Alternatively, however, equal wall thicknesses also can be provided in the shell surface portions, wherein in the case of stronger differences in the cross-sectional areas of the pressure chambers it can also be taken into consideration to form the wall thickness of the housing shell in the region of the lateral, smaller pressure chambers thinner than in the central housing portion which defines the larger pressure chamber on the side of the shell surface.

Depending on the intended use, the swivel shafts can perform swivel movements in the same or in opposite directions, wherein in use as grab drive in particular oppositely directed swivel shaft drive movements can be provided. In a manner known per se, the two swivel shafts each can be two oppositely oriented screw engagement portions, which each are in screw engagement with one of the two shaft drive pieces, so that a rotation of the swivel shafts in the one direction is achieved by moving the two shaft drive pieces towards each other, and a rotation of the swivel shafts in the opposite direction is achieved by moving the two shaft drive pieces apart from each other. Rotating in the one direction or rotating in the other direction advantageously does not mean that both shafts rotate in the same direction, so that the two swivel shafts each rotate in opposite directions, in particular to in one case achieve swiveling apart of the grab shells and in the other case achieve swiveling together of the grab shells.

In a development of the invention the pistons preferably can have sealing portions arranged towards their sides facing each other, which run on the swivel shafts. The swivel shafts advantageously can each have a toothing-free portion between their oppositely threaded screw engagement portions, on which the aforementioned sealing portions of the pistons are running. In particular, the toothing-free portions can have a smooth, cylindrical surface and can have a diameter at least as large as the screw engagement portions, so that the sealing portions of the pistons can slide on the toothing-free portions with a precise fit. In this way, not only a stabilization of the pistons with respect to tilting moments, but also a sealing of the pistons at the swivel shafts can be achieved.

In addition to the sealing of the pistons with respect to the swivel shafts, the pistons advantageously also are sealed towards the outside, i.e. the inner shell surfaces of the cylinder pressure chambers. In a development of the invention each of the differently contoured piston running surfaces of each piston has a sealing portion with which the two piston running surfaces of each piston are sealed on the one hand towards the shell surface of the larger cylinder pressure chamber and on the other hand towards the shell surface of the smaller cylinder pressure chamber.

The pitch of the screw engagement portions can be chosen differently in principle and be adapted to the swivel angle of the swivel shafts to be achieved on the one hand and to the torques to be achieved at the swivel shafts on the other hand. In a development of the invention, a favorable compromise for the proposed arrangement of two oppositely threaded shaft drive pieces comprises in that the oppositely threaded screw engagement portions of the swivel shafts each have a pitch angle in the range from 30° to 60°. Preferably, the pitch angle is between 40° and 50°, wherein according to an advantageous embodiment it can be about 45°. As mentioned already, different pitch angles however are possible in principle, depending on which swivel angles must be achieved by the swivel shafts and which torques must be achieved thereby.

These and other objects, features and advantages of the present invention will become more apparent upon reading the following specification in conjunction with the accompanying drawing figures.

BRIEF DESCRIPTION OF THE DRAWINGS

Various features and advantages of the present invention may be more readily understood with reference to the following detailed description taken in conjunction with the accompanying drawings, wherein like reference numerals designate like structural elements, and in which:

FIG. 6 shows a frontal view of the swivel drive similar to FIG. 3, wherein further sectional planes are depicted, which then are shown in FIGS. 7 and 8, FIG. 7 shows a longitudinal section through one of the swivel shafts along line A-A in FIG. 6, which corresponds to a longitudinal section which as compared to the longitudinal sections of FIGS. 4 and 5 is made in the vertical plane, and FIG. 8 shows a longitudinal section through the swivel drive between its two swivel shafts along line B-B in FIG. 6, according to which one of the two swivel shafts is not shown in section.

DETAILED DESCRIPTION OF THE INVENTION

Figure 1:
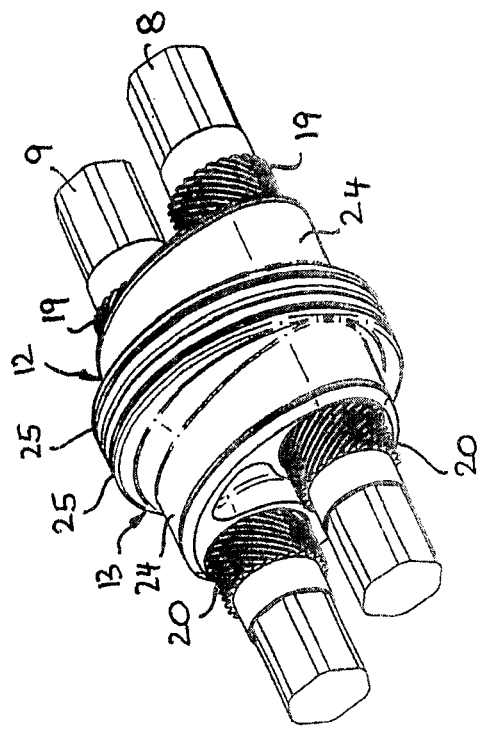
FIG. 1 shows a perspective, schematic representation of a hydraulic swivel drive with two swivel shafts and a pair of shaft drive pieces drivable in opposite directions for driving the swivel shafts in a partial section, wherein in the portion of the representation cut free the two shaft drive pieces and one of the swivel shafts can be seen.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

The swivel drive 3 shown in FIG. 1 comprises a drive housing 1 which is formed as shell carrier and in a usual manner can be coupled to the arm of an excavator or another lifting gear. On its upper side, the drive housing 1 can include a ring-shaped pivot bearing 2 and a non-illustrated rotary drive associated to the same, in order to be able to rotate the grab about an upright axis.

The housing 1 comprises two end walls 4 and 5 parallel to each other, which are connected with each other by a possibly multipart housing shell 6, so that the end walls 4 and 5 together with the housing shells 6 define an interior space 7.

In the interior of the housing 1 the two swivel shafts 8 and 9 are arranged parallel to each other and spaced from each other. They are rotatably, but axially firmly mounted in the end walls 4 and 5 by means of a bearing 10 and protrude out of the housing with their peg-shaped shaft ends 11. To the peg-shaped shaft ends 11 grab shells, which are not shown in the drawing, can be coupled non-rotatably in a manner known per se, so that the grab shells can be swiveled open and closed by rotating the swivel shafts 8 and 9.

Figure 2:
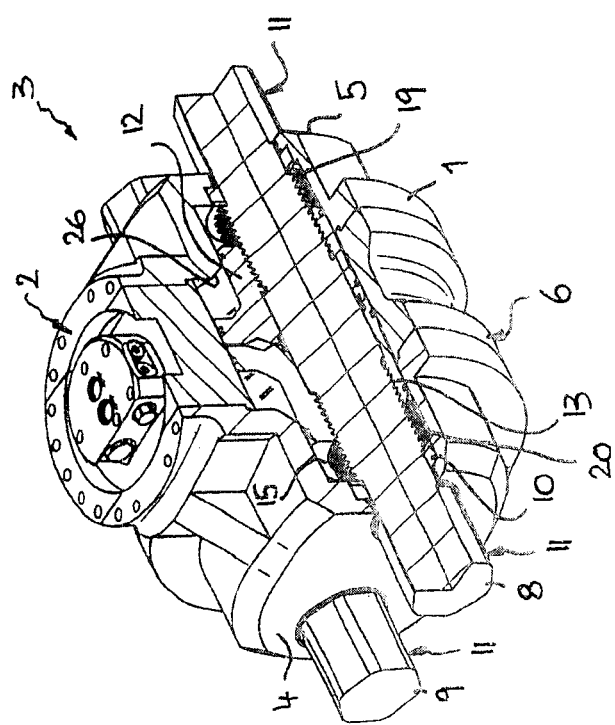
FIG. 2 shows a partial perspective representation of the two pistons and the two swivel shafts, on which the pistons are seated, which shows the differently shaped piston running surfaces.

To rotatorily drive the swivel shafts 8 and 9, two pistons 12 and 13 drivable in opposite directions are provided, which each enclose the two swivel shafts 8 and 9 and are in screw engagement with the respective swivel shaft 8 and 9. As shown in FIGS. 1 and 2, each piston 12 and 13 can shiftably be seated in the interior of the drive housing 1 parallel to the swivel shafts 8 and 9. The housing 1 forms the cylinder for the shaft drive pieces 12 and 13, on both of whose outer sides a pressure chamber 15 and 16 is formed and between which a common pressure chamber 17 or possibly two separate pressure chambers is/are formed. By introducing hydraulic fluid into the pressure chambers 15 and 16, the shaft drive pieces 12 and 13 can be moved towards each other and by introduction into the pressure chamber 17 can be moved apart from each other and hence the swivel shafts 8 and 9 can be rotated correspondingly.

Figure 3:
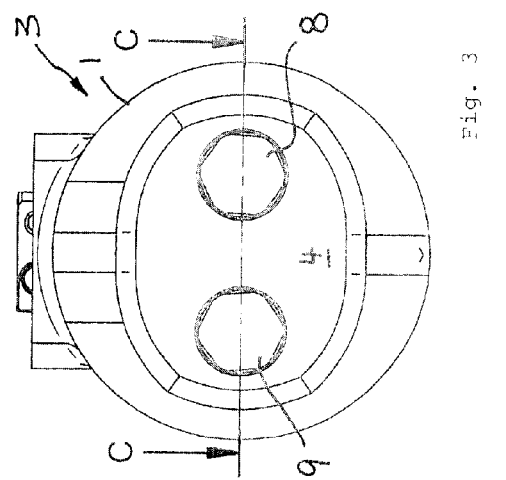
FIG. 3 shows a frontal side view of the swivel drive, which shows the two protruding portions of the swivel shafts.

As shown in FIG. 3 or FIG. 8, each swivel shaft 8 and 9 has two oppositely threaded screw engagement portions 19 and 20, whose screw toothings have opposite pitches. In FIG. 8, the screw engagement portion 19 shown there on the left is formed as right-hand thread and the screw engagement portion 20 shown there on the right is formed as left-hand thread. Although this need not necessarily be provided, the two screw engagement portions 19 and 20 advantageously have the same amount of pitch angle, which advantageously can lie in the range from 30° to 60°, for example amount to 45°.

Figure 4:
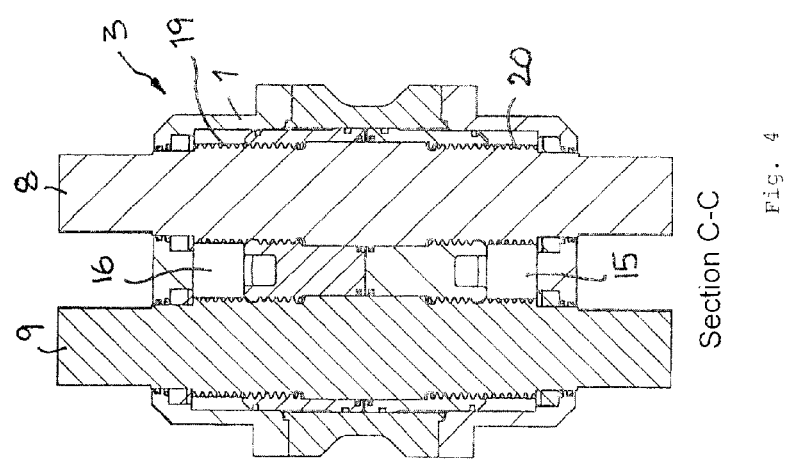
FIG. 4 shows a longitudinal section through the two swivel shafts of the swivel drive along line C-C in FIG. 3, wherein the two pistons are shown in their position moved together, which can correspond to a position of the grab swiveled open.

Between the two screw engagement portions 19 and 20, each swivel shaft 8 and 9 has a toothing-free portion 21, which has a smooth cylindrical surface and advantageously can have a slightly larger diameter than the external diameter of the screw engagement portions 19 and 20. As shown in FIG. 4 or 7, the toothing-free portion 21 can be offset from the screw engagement portions 19 and 20 by an undercut 22. Although not depicted especially, the toothing-free portion 21 can be divided into two sub-portions, each of which is associated to one of the screw engagement portions 19 and 20, respectively.

Figure 5:
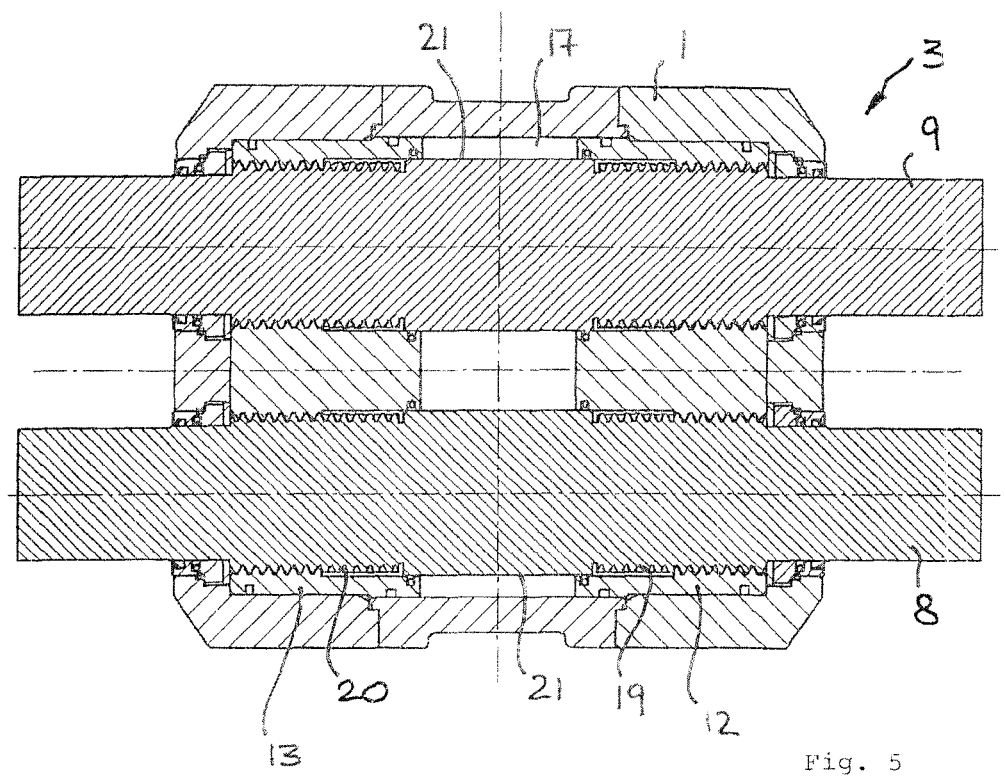
FIG. 5 shows a longitudinal section through the two swivel shafts of the swivel drive similar to FIG. 4, wherein the two pistons are shown in their position moved apart, which can correspond to a position of the grab swiveled together.

As shown in FIGS. 4 and 5, the two pistons 12 and 13 each have a sealing portion 23, which likewise is formed tubular and encloses the respective swivel shaft 8 and 9, respectively. As is illustrated in FIGS. 4 and 5, the sealing portions 23 can run on the toothing-free portion 21 of the respective swivel shaft, in order to achieve a guidance and a sealing of the pistons 12 and 13 with respect to the swivel shafts 8 and 9.

As shown in FIG. 1, the outer contour of the pistons 12 and 13 is adapted to the inner contour defined by the housing 1, which forms the cylinders and the pressure chambers 15, 16 and 17, and is sealed by suitable sealing means.

As shown in the Figs., the lateral external pressure chambers 15 and 16 on the one hand and the internal pressure chamber 17 between the pistons 12 and 13 on the other hand have various cross-sectional contours and also various sizes of cross-sectional areas. To allow each piston 12 and 13 to run in such differently shaped and differently large pressure chambers 15 and 17 or 16 and 17, each piston 12 and 13 has two differently shaped piston running surfaces 24 and 25 which are provided on axially different piston portions and are formed by corresponding external shell surface portions of the piston 12 or 13. As shown in FIG. 2, each of the pistons 12 and 13 has a more strongly flattened piston running surface 24 and a less flattened piston running surface 25, wherein the arrangement of the two piston running surfaces 24 and 25 advantageously can be made such that—as seen in longitudinal direction of the swivel shafts—the more strongly flattened piston running surface 24 is arranged completely within the contour of the less flattened piston running surface 25. In particular, the longer main axis of the more strongly flattened piston running surface 24 also can be even shorter than the corresponding main axis and/or the diameter of the less flattened piston running surface 25, cf. FIG. 2.

In an advantageous development of the invention the less flattened piston running surface 25 can at least approximately have a circular contour, while—independent of a circular or not exactly circular contouring of the less flattened piston portion 25—the more strongly flattened piston running surface advantageously can have an oval or elliptical or similarly rounded circumferential contour, cf. FIG. 2.

In an advantageous development of the invention the longer main axis of the cross-section of the flattened piston running surface 25 extends parallel to a connecting line through the two swivel shafts 8 and 9, while the shorter main axis of the cross-section of the more flattened piston running surface 24 extends vertically to a plane connecting the two swivel shafts 8 and 9. When the less flattened piston running surface 25 is not exactly circularly contoured on its circumference, but also slightly flattened, the longer and shorter main axes of the cross-sectional contour of the less flattened piston running surface 25 can be aligned correspondingly.

As shown in FIG. 2, each of the pistons 12 and 13 can have a beveled contour in the region between the piston running surfaces 24 and 25, so that the respective piston 12 or 13 does not form a rectangular step between the two piston running surfaces 24 and 25, cf. FIG. 2.

The shell surfaces of the associated cylinder pressure chambers 15 and 16 as well as 17 formed by housing portions of the drive housing 1 are adapted to the piston running surfaces 24 and 25. As shown in particular in FIG. 1, the shell-surface-side walls of the drive housing 1 in the region of the lateral, outer pressure chambers 15 and 16 are contoured oval or elliptical or similarly rounded, so that the pressure chambers 15 and 16 have an oval, elliptical or similarly rounded cylindrical shape. In contrast thereto, the central portion of the housing shell 6 which defines the inner pressure chamber 17 in the region between the pistons 12 and 13 is flattened less strongly and in particular contoured at least approximately circular—as seen in cross-section vertically to the shaft longitudinal axes,—so that the piston running surfaces 25 of the two pistons 12 and 13 run in an at least approximately circular-cylindrical cylinder pressure chamber 17.

As shown in FIGS. 1, 7 and 8, a beveled shell surface transition is provided at the housing shell 6 between the circular-cylindrical inner pressure chamber 17 and the lateral, outer pressure chambers 15 and 16, cf. reference numeral 26 in FIGS. 1, 7 and 8, in order to provide for a bevel between the piston running surfaces 24 and 25. For example, between the piston running surfaces 24 and 25 and/or between the inner pressure chamber 17 and the outer pressure chambers 15 and 16 a bevel can be provided at an angle of about 45° to a plane which is vertical to the swivel shaft longitudinal axes. Other bevel angles and/or rounded bevel transitions can, however, also be provided.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A hydraulic swivel drive for a grab that has two gripping arms or shells movable like tongs, comprising two swivel shafts rotatably mounted in a drive housing and parallel to each other, whose shaft ends are connectable with the gripping arms, wherein the swivel shafts each have two oppositely threaded screw engagement portions, with which two pistons movable in opposite directions for driving the swivel shafts are in screw engagement, wherein the pistons each have two piston running surfaces on the outer shell surface, which are shaped differently in cross-section and are arranged to run in differently large cylinder pressure chambers shaped differently in cross-section, which are formed by the drive housing.

2. The hydraulic swivel drive according to claim 1, wherein the pistons are arranged to face each other with their respective larger piston running surfaces.

3. The hydraulic swivel drive according to claim 1, wherein the pistons between themselves define at least one pressure chamber whose cross-sectional area is larger than the cross-sectional area of the pressure chambers which are provided on the sides of the two pistons facing away from each other.

4. The hydraulic swivel drive according to claim 1, wherein the drive housing defines at least one circular-cylindrical cylinder pressure chamber between the pistons and on the sides of the pistons facing away from each other defines two cylinder pressure chambers with a cylindrical shape deviating from the circular-cylindrical shape, in particular with oval or elliptical cross-section.

5. The hydraulic swivel drive according to claim 1, wherein the drive housing in the region of its shell surface, which defines the pressure chamber between the pistons, has a different wall thickness than in the region of a shell-surface-side portion which defines the outer pressure chambers on the sides of the pistons facing away from each other.

6. The hydraulic swivel drive according to claim 1, wherein each piston on each of its piston running surfaces has a sealing portion for sealing the shell surface against the larger and smaller pressure chambers.

7. The hydraulic swivel drive according to claim 1, wherein the swivel shafts each have a toothing-free portion between their oppositely threaded screw engagement portions.

8. The hydraulic swivel drive according to claim 1, wherein the piston running surface of larger cross-sectional area of the pistons has a cross-sectional area in the range from 125% to 300% of the cross-sectional area of the smaller piston running surface.

9. The hydraulic swivel drive according to claim 1, wherein the screw engagement portions have a pitch angle in the range between 30° and 60°.

10. The hydraulic swivel drive according to claim 1, wherein the screw engagement portions have a pitch angle in the range between 40° and 50°.

11. The hydraulic swivel drive according to claim 1, wherein from the piston running surfaces of each piston one piston running surface is flattened less as seen in cross-section, and the other piston running surface is flattened more strongly.

12. The hydraulic swivel drive according to claim 11, wherein the less flattened piston running surface has an at least approximately circular cross-section and/or the more strongly flattened piston running surface has an oval and/or elliptical cross-section.

13. The hydraulic swivel drive according to claim 11, wherein as seen in longitudinal direction of the swivel axis the contour of the more strongly flattened piston running surface lies completely within the contour of the less flattened piston running surface.

14. The hydraulic swivel drive according to claim 13, wherein both a longer main axis and a shorter main axis of the cross-section of the more strongly flattened piston running surface is smaller than a diameter of the less flattened piston running surface or than the shorter and longer main axes of the cross-section of the less flattened piston running surface.

15. The hydraulic swivel drive according to claim 11, wherein the more strongly flattened piston running surface is aligned such that a longer main axis of the cross-section of this more strongly flattened piston running surface extends parallel to a connecting plane which connects the two swivel shafts and the shorter main axis of the cross-section of the more strongly flattened piston running surface is vertical to the connecting plane.

16. The hydraulic swivel drive according to claim 1, wherein each piston on its side facing the respective other piston has a shaft sealing portion for sealing against the swivel shafts.

17. The hydraulic swivel drive according to claim 16, wherein the toothing-free portion forms a guiding and/or sealing portion on which the sealing portions of the pistons are longitudinally shiftably seated.

18. A clamshell grab comprising the hydraulic swivel drive of claim 1.

19. A hydraulic swivel drive for a grab comprising:
a drive housing having an outer surface;
two pistons, each piston shaped differently in cross-section, and each piston having two piston running surfaces on the outer surface of the piston; and
two cylinder pressure chambers formed by the drive housing, each cylinder pressure chamber shaped differently in cross-section;
wherein the two pistons are arranged to run in the two cylinder pressure chambers, one piston in one chamber; and
wherein the two pistons are movable in opposite directions.

20. The hydraulic swivel drive according to claim 19 further comprising two swivel shafts rotatably mounted in the drive housing and parallel to each other;
wherein the swivel shafts each have two oppositely threaded screw engagement portions, such that via a screw engagement the opposing movement of the two pistons drives the swivel shafts.

* * * * *